United States Patent
Huang

(10) Patent No.: US 6,527,240 B1
(45) Date of Patent: Mar. 4, 2003

(54) FRAME FOR INSTALLING BEVERAGE HOLDER

(76) Inventor: Pei-Hsiu Huang, 4/F1, No. 12-1, Alley 15, Lane214, Chung-Hsin Road, Sec. 4, Sanchung City, Taipei Hsien (TW)

( * ) Notice: Subject to any disclaimer, the term of this patent is extended or adjusted under 35 U.S.C. 154(b) by 0 days.

(21) Appl. No.: 10/116,662

(22) Filed: Apr. 2, 2002

(30) Foreign Application Priority Data

Apr. 9, 2001 (TW) .................................... 090205383 U

(51) Int. Cl.⁷ ............................................... A47K 1/08
(52) U.S. Cl. ............................. 248/311.2; 248/218.4; 248/231.41
(58) Field of Search ......................... 248/311.2, 218.4, 248/219.1, 292.12, 229.12, 229.22, 229.14, 229.24; 224/274, 192

(56) References Cited

U.S. PATENT DOCUMENTS 5,603,477 A * 2/1997 Deutsch ................. 248/292.12
5,634,620 A * 6/1997 Verot ..................... 248/229.14
5,853,158 A * 12/1998 Riggle ......................... 248/103
6,161,741 A * 12/2000 French ........................ 224/192
6,325,350 B1 * 12/2001 Mancuso ..................... 224/274
2002/0109062 A1 * 8/2002 Thompson

* cited by examiner

Primary Examiner—Ramon O. Ramirez

(57) ABSTRACT

A frame for installing beverage holder comprises a recess having gear teeth along its inner edge and a through hole on the back of the fixing plate so as to assemble with a fixing frame which consists of a positioning seat, a V-shaped seat and a reverse V-shaped seat for convenient installation and use. The said frame further includes at least two rubber plates with same or different thickness or length to be rolled and disposed between the V-shaped seat and the reverse V-shaped seat, and some reinforcing plates are provided on the outer sides of the two sides of the V-shaped or the reverse V-shaped seat body for reinforcement. The frame for installing beverage holder of present invention herein can be installed on an appliance for utilization at a vertical, horizontal or inclined state on a pipe or a rod of different diameters. A bottle, a can, a cup, or other similar container of beverage can be disposed on the beverage holder for use very conveniently.

3 Claims, 4 Drawing Sheets

FRAME FOR INSTALLING BEVERAGE HOLDER

BACKGROUND OF THE INVENTION

The present invention is related to a frame for installing beverage holder and particularly to a frame for installing beverage holder of which the installation and use are much more convenient than ever before.

A conventional beverage holder 1a, as shown in FIGS. 7 and 8, is mainly comprised of a fixing plate 11a, a base 12, two clips 13 and a clip-pivoted lever 14, wherein the major drawbacks consist in the back of plate body 110a of the fixing plate 11a of the beverage holder 1a as shown in FIG. 8 is not provided with any accessory for mounting and fixing except some through holes 111 are provided on the plate body 110a, therefore the holder 1a can only be fixed on the vertical or horizontal wall indoors, in the car or of some appliance by means of screws, or a piece of double-sided adhesive plate is provided on the back of the plate body 110a and then the holder 1a is directly adhered to the said wall but cannot be fixed on the appliance made of pipes or rods such as bicycle, wheeled chair or baby cart, so the purpose of the holder 1a is rather limited.

SUMMARY OF THE INVENTION

In view of the foregoing drawbacks of the conventional beverage holder 1a, the inventor of the present invention particularly invented the present frame for installing beverage holder through his research and experimentation.

The object of the present invention is carried out in such a way: a frame for installing beverage holder consists of a fixing plate, a base, two clips and a clip-pivoted lever and is characterized in such a design: a recess having gear teeth along its inner edge and a through hole are provided on the back of the fixing plate so as to fix and install a fixing frame which consists of a positioning seat, a V-shaped seat and a reverse V-shaped seat; one side of the positioning seat is provided with a protuberance of which the outer peripheral wall is provided with some gear teeth, and a screw is fixed in the center of the protuberance so as to assemble with the recess on the fixing plate; another side thereof is provided with at least more than two first hinge connector so as to assemble with the V-shaped seat which consists of at least more than two second hinge connector on one side of a horizontal V-shaped fame body in general corresponding to the foregoing first hinge connector so as to assemble with the positioning seat; each one hole is provided on two sides of the horizontal V-shaped frame body so as to assemble with the reverse V-shaped seat; two nuts are provided on two sides of the reverse V-shaped seat body and corresponding to the two holes on the V-shaped seat so as to assemble with the V-shaped seat by means of two screws, and at least more than two rubber plates with same or different thickness or length are rolled as a cylinder and then disposed between the V-shaped and reverse V-shaped seats.

The major advantage of the present invention consists in directly fixing-it on or adhering it to the vertical or horizontal wall indoors, in a car or of some appliance and particularly fixing it to the fixing frame on the back of the fixing plate so as to fix it on the vertical, horizontal or inclined pipe or rod of some appliance.

DETAILED DESCRIPTION OF THE INVENTION

Figure 5:
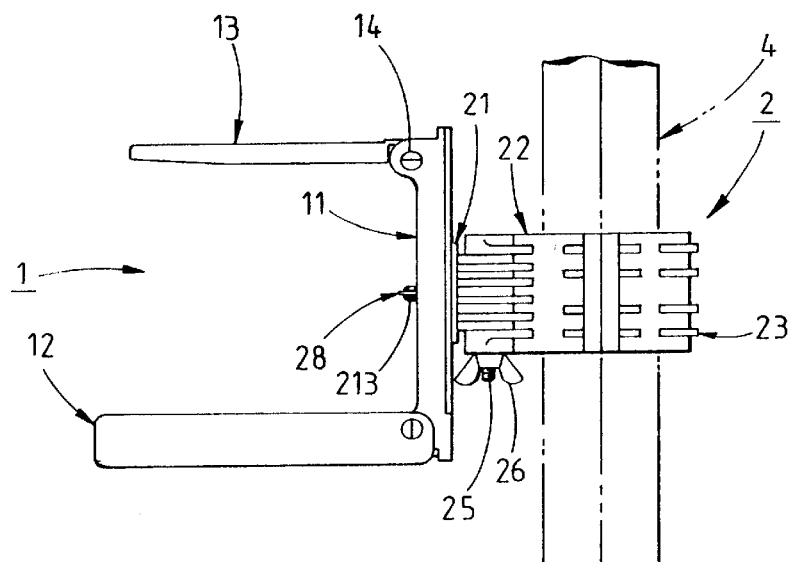
FIG. 5 is an optional drawing of the present invention installed on a vertical pipe or rod for use.
Figure 3:
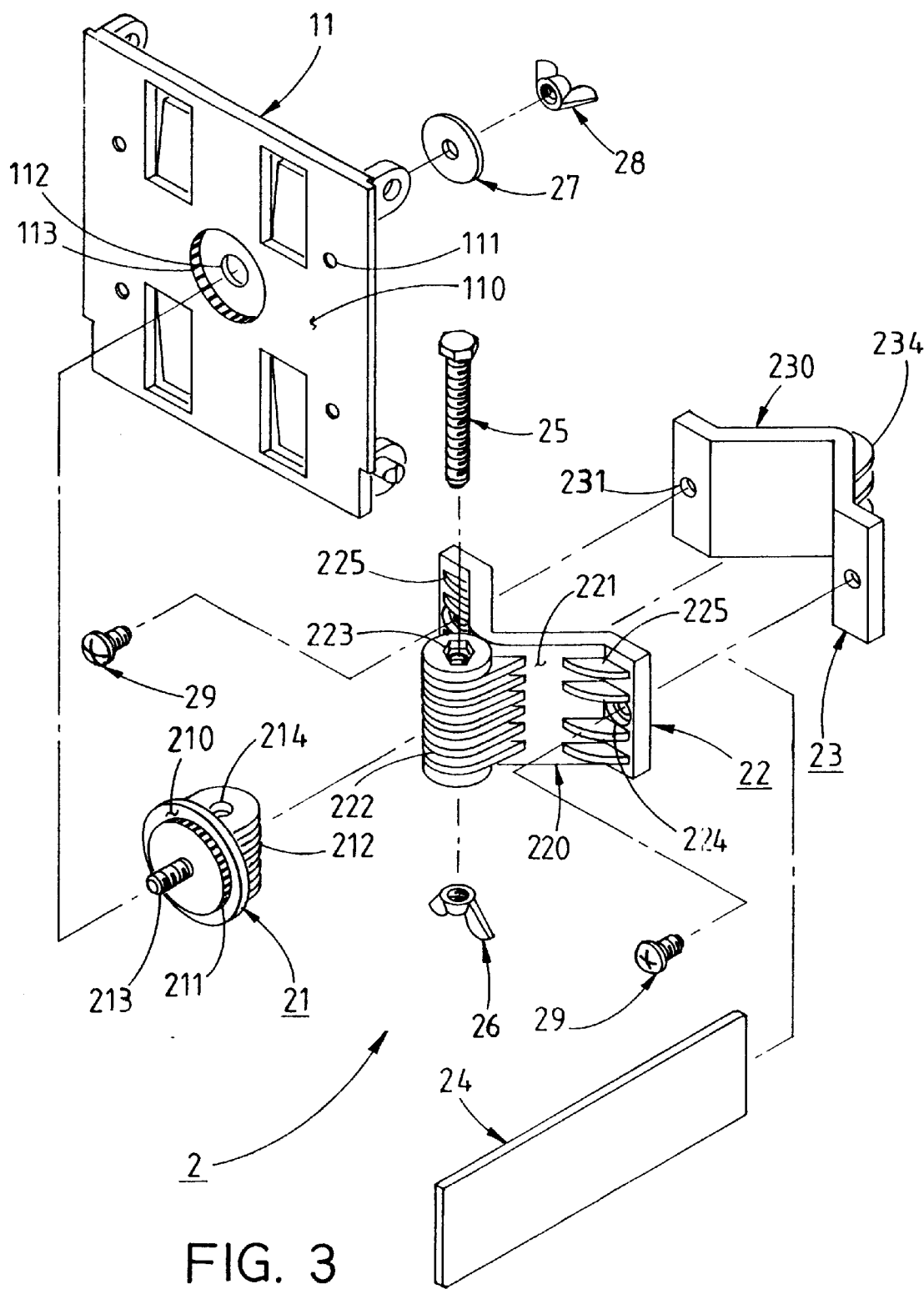
FIG. 3 is an elevation breakdown view of the present invention.
Figure 6:
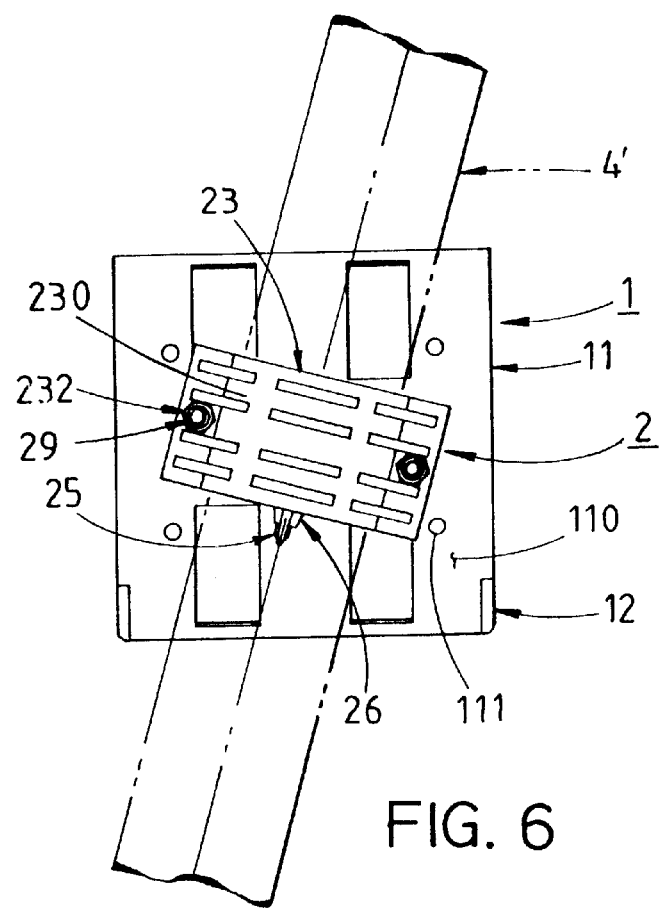
FIG. 6 is an optional drawing of the present invention installed on a inclined pipe or rod for use.
Figure 7:
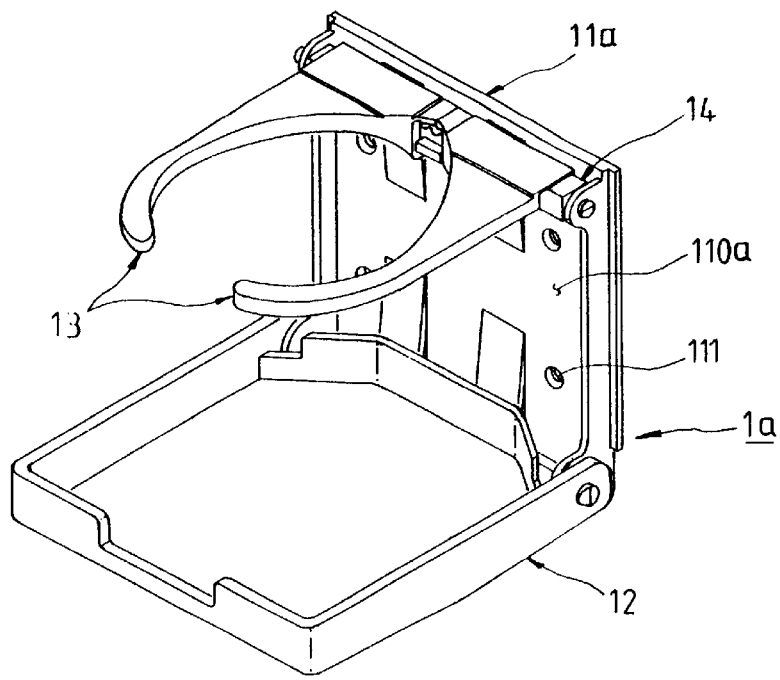
FIG. 7 is an elevation view of a conventional beverage holder.
Figure 8:
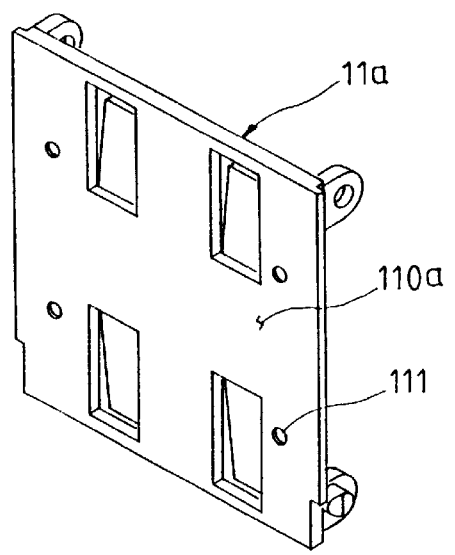
FIG. 8 is an elevation view of the back of the fixing plate of a conventional beverage holder.

The present invention can be best described in detail in conjunction with a better embodiment and the accompanied drawings as follows:

As indicated in FIGS. 5, 6 as well as FIG. 3, the beverage holder 1 of the present invention consists of a fixing plate 11, a base 12, two clips 13 and a clip-pivoted lever 14; some through holes 111 are provided on the plate body 110 of the fixing plate 11 of the beverage holder 1, and a recess 113 comprising gear teeth along its inner edge and a through hole 112 are provided on the back of the fixing plate 11. As shown in FIG. 3, a fixing frame 2 consists of a positioning seat 21, a V-shaped seat 22 and a reverse V-shaped seat 23. As shown in FIGS. 5 and 6, the beverage holder 1 can be installed on a vertical, horizontal or inclined forward, rearward, leftward or rightward rectangular (or round, oblate or similar shape) pipe 4, 4' or rod of an appliance (such as wheeled chair, baby cart or bicycle) for use. So such beverage as bottled milk, mineral water, soda water can be disposed on the beverage holder for use very conveniently.

Figure 4:
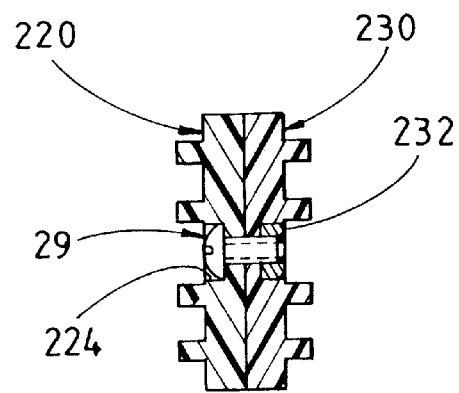
FIG. 4 is a section view on the line 4–4' of FIG. 1.

Referring to a plate body 210 of the positioning seat 21 in FIG. 3, one side of the positioning seat 21 is provided with a protuberance 211 of which the outer peripheral wall is provided with spur pear teeth or similar gear teeth, and a screw 213 is fixed in the center of the protuberance 211 so as to assemble with the recess 113 on the fixing plate 11 by means of a butterfly nut 28 or an ordinary nut together with a washer 27 as shown in FIGS. 5 and 6. A first hinge connector 212 comprising more than two hinges at least and a through hole 214 is provided on another side of the plate body 210 so as to assemble with the V-shaped seat 22 as shown in FIGS. 1, 2, 5, and 6. The V-shaped seat 22 is a seat body 220 comprising a second hinge connector 222 (corresponding to the first hinge connector 212) with more than two hinges at least and a through hole 223 on one side (bottom) of a horizontal V-shaped frame body 221 in general so as to assemble with the positioning seat 21 by means of a bolt 25 and a butterfly nut 26 or an ordinary nut as shown in FIGS. 1, 2, 5 and 6. One hole 224 is provided on each side of the horizontal V-shaped frame body 221 of the seat body 220 so as to assemble with the reverse V-shaped seat 23 which is a horizontal reverse V-shaped seat body 230 in general. Two holes 231 are provided on the two sides of the seat body 230 and corresponding to the two holes 224 on the seat body 220 of the V-shaped seat 22, and one nut 232 is buried in each hole 231 (as shown in FIG. 4) or two threaded apertures are provided on the seat body 230 so as to assemble with the V-shaped seat 22 by means of two screws 29.

Figure 1:
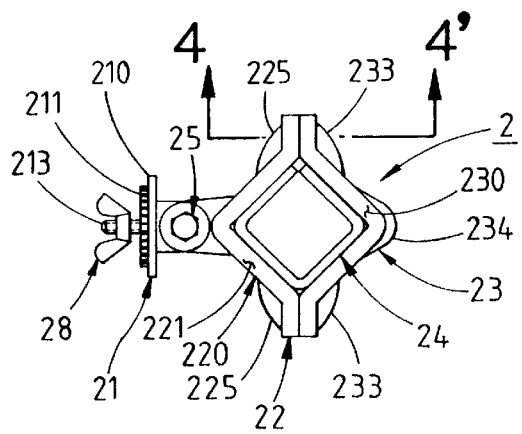
FIG. 1 is a top view of the present invention.
Figure 2:
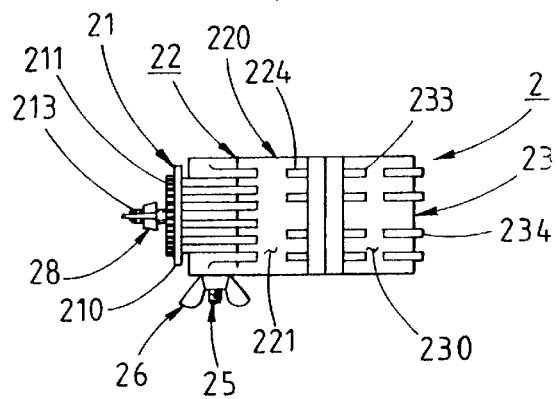
FIG. 2 is a right side view of the present invention.

The diameters of pipe body 4, 4' or rod body of such appliance as the baby cart, wheeled chair or bicycle in general differ from each other but the size of V-shaped inserting edge of the V-shaped seat 22 and reverse V-shaped seat 23 of the present invention can be provided according to the largest diameter of the said appliance, and at least more than two rubber plates 24 with same or different thickness or length as shown in FIG. 3 are provided so as to roll one or more than one rubber plate 24 as a cylinder to be disposed between the V-shaped seat 22 and the reverse V-shaped seat 23 as shown in FIG. 1 and applied to at least more than two pipes or rods with smaller diameters. Meantime, in order to avoid the V-shaped seat 22 and reverse V-shaped seat 23 from deformation when they assemble with each other or from failure to fix them firmly on a pipe body 4, 4' or a rod as shown in FIGS. 5 and 6, more than two reinforced plates 225 may be provided on the outer sides of the two sides of the horizontal V-shaped frame body 221, and more than two reinforced plates 233, 234 may be provided on the outer sides of the two sides of the reverse V-shaped seat body 230 and in the center of the outer sides thereof as shown in FIGS. 1 and 2 for reinforcement.

To install the present invention for use, as shown in FIG. 5, the procedures are described as follows: (1) insert the protuberance 211 on the positioning seat 21 into the recess 113 on the back of the fixing plate 11 of the beverage holder 1; (2) make the screw 213 on the protuberance 211 get through the through hole 112 in the center of the recess 113; (3) nest a washer 27 on the screw 213 and lock the screw 213 by means of a butterfly nut 28 or an ordinary nut; (4) make the second hinge connector 222 on the V-shaped seat assemble with the first hinge connector 212 on the positioning seat 21 by means of a bolt 25 and a butterfly nut 26 or an ordinary nut; (5) install the beverage holder 1 on the vertical, horizontal or inclined rectangular (or round or oblate) pipe body 4, 4' or rod body of an appliance (such as wheeled chair, baby cart or bicycle) by means of two screws in keeping with the reverse V-shaped seat 23 as shown in FIG. 5 and FIG. 6 for disposing the bottled, canned or cup-contained beverage. No matter the beverage holder 1 is installed on a vertical or horizontal or inclined pipe body 4, 4' or rod body, only to loosen the butterfly nut 28 on the positioning seat 21 of the fixing frame 2 can adjust the beverage holder 1 to be vertical through swinging it leftward or rightward in respect of the screw 213 on the positioning seat 21 as an axis; meantime, the butterfly nut 26 between the positioning seat 21 and the V-shaped seat 22 can be loosened so as to adjust the direction of beverage holder 1 through swinging it leftward or rightward in respect of the bolt 25 fixing the positioning seat 21 and the V-shaped seat 22 as an axis. Therefore, it is very convenient to install the present invention on a vertical or horizontal or inclined pipe body 4, 4' or rod body for use.

The fixing frame 2 of the present invention is particularly designed for a beverage holder 1 but can be used as a frame for installing such articles as an umbrella, a reading board or a dining board if the back or one side of these articles is provided with an inner edge comprising a toothed recess and a through hole and these articles can be fixed on a vertical, horizontal or inclined rectangular (or round or oblate) pipe body 4, 4' or rod body of an appliance such as a wheeled chair, a baby cart or a bicycle for bringing an umbrella or dining, taking notes and reading books or newspapers.

What is claimed is:

1. A frame for installing beverage holder wherein the beverage holder consists of a fixing plate, a base, two clips and clip-pivoted lever;

a recess having gear teeth along its inner edge and a through hole are provided on the back of the said fixing plate so as to fix a fixing frame;

the fixing frame consists of a positioning seat, a V-shaped seat and a reverse V-shaped seat; and one side of the said positioning seat is provided with a protuberance of which the outer peripheral wall is provided with some gear teeth, and a screw is fixed in the center of the protuberance so as to assemble with the recess on the back of the fixing plate, and another side thereof is provided with a first hinge connector having at least more than two hinges so as to assemble with the V-shaped seat, which is characterized in the V-shaped seat, that is a seat body, comprising a second hinge connector—corresponding to the first hinge connector of the positioning seat—with more than two hinges at least on one side of a horizontal V-shaped frame body in general so as to assemble with the positioning seat, and one hole is provided on each side of the horizontal V-shaped seat body so as to assemble with the reverse V-shaped seat; and the reverse V-shaped seat, that is a horizontal reverse seat body in general, wherein two holes are provided on the two sides of the seat body and corresponding to the two holes on the seat body of the V-shaped seat, and one nut is buried in each hole, or two threaded apertures are provided on the seat body so as to assemble with the V-shaped seat.

2. A frame for installing beverage holder as claimed in claim 1 comprises at least two rubber plates with same or different thickness or length to be rolled as a cylinder and disposed between the V-shaped seat and the reverse V-shaped seat of the fixing frame.

3. A frame for installing beverage holder as claimed in claim 1 is characterized in: more than two reinforcing plates provided on the outer sides of the two sides of the horizontal V-shaped frame body of the V-shaped seat respectively; and more than two reinforcing plates provided on the outer sides of the two sides of the reverse V-shaped seat body of the reverse V-shaped seat and in the center of the outer sides thereof respectively.

* * * * *